(12) United States Patent
Boren

(10) Patent No.: US 9,376,201 B2
(45) Date of Patent: Jun. 28, 2016

(54) DUAL BOARDING SYSTEM FOR AIRCRAFT

(71) Applicant: The Boeing Company, Chicago, IL (US)

(72) Inventor: Kelly L. Boren, Marysville, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 14/943,019

(22) Filed: Nov. 16, 2015

(65) Prior Publication Data

US 2016/0068249 A1 Mar. 10, 2016

Related U.S. Application Data

(62) Division of application No. 13/236,904, filed on Sep. 20, 2011, now Pat. No. 9,187,176.

(51) Int. Cl.
*B64D 11/00* (2006.01)
*B64C 1/14* (2006.01)
*B64C 1/18* (2006.01)

(52) U.S. Cl.
CPC ............ *B64C 1/1423* (2013.01); *B64C 1/18* (2013.01)

(58) Field of Classification Search
CPC ......... B64D 11/00; B64C 1/1423; B64C 1/18
See application file for complete search history.

(56) References Cited

U.S. PATENT DOCUMENTS

| | | | |
|---|---|---|---|
| 2,124,003 A | 7/1938 | McDonnell, Jr. et al. | |
| 3,730,583 A | 5/1973 | Colovas et al. | |
| 5,115,999 A | 5/1992 | Buchsel et al. | |
| 5,176,082 A * | 1/1993 | Chun | B61B 1/02 104/28 |
| 5,259,576 A | 11/1993 | Howard | |
| 5,992,797 A * | 11/1999 | Seidel | B64C 1/00 244/118.5 |
| 6,474,599 B1 * | 11/2002 | Stomski | B64C 1/1469 109/68 |
| 6,585,189 B1 | 7/2003 | Smallhorn | |
| 6,666,406 B2 | 12/2003 | Sankrithi et al. | |
| 6,669,141 B2 | 12/2003 | Schmidt-Schaeffer | |
| 6,722,612 B2 | 4/2004 | Konya | |
| 6,766,986 B2 * | 7/2004 | Konya | B64F 1/305 244/118.5 |
| 6,772,977 B2 | 8/2004 | Dees et al. | |
| 6,834,833 B2 | 12/2004 | Sankrithi | |
| 7,083,146 B2 | 8/2006 | Hiesener | |
| 7,252,268 B2 | 8/2007 | Saint-Jaimes | |

(Continued)

FOREIGN PATENT DOCUMENTS

WO WO9835876 A1 8/1998
WO WO2004018290 A1 3/2004

OTHER PUBLICATIONS

Extended European Search Report, dated Sep. 10, 2014, regarding Application No. EP12183860.1, 6 pages.

(Continued)

*Primary Examiner* — Justin Benedik
(74) *Attorney, Agent, or Firm* — Yee & Associates, P.C.

(57) ABSTRACT

A method and apparatus for boarding an aircraft. Passengers may be lined up in a first line and a second line relative to a doorway for the aircraft. A flow of the passengers in the first line and the second line may be controlled through a corridor connecting the doorway to a first aisle and a second aisle in an interior of the aircraft. The flow of the passengers may pass through a number of spaces in the corridor. The number of spaces may be reserved for a number of crew members during an emergency operation in which the passengers exit the aircraft.

20 Claims, 12 Drawing Sheets

(56) References Cited

U.S. PATENT DOCUMENTS

| | | | |
|---|---|---|---|
| 7,896,291 | B2 | 3/2011 | Dehn et al. |
| 8,534,216 | B2 * | 9/2013 | Wallace ................. G09B 19/00 116/200 |
| 2002/0063187 | A1 * | 5/2002 | Depeige ................. B64C 39/02 244/137.2 |
| 2003/0062449 | A1 | 4/2003 | Sankrithi |
| 2003/0106962 | A1 | 6/2003 | Smallhorn |
| 2003/0189135 | A1 | 10/2003 | Konya |
| 2004/0195450 | A1 | 10/2004 | Hiesener |
| 2007/0278346 | A1 | 12/2007 | Masset-Bosc et al. |
| 2009/0173825 | A1 * | 7/2009 | Dehn ..................... B64C 1/1438 244/129.5 |
| 2013/0068890 | A1 | 3/2013 | Boren |

OTHER PUBLICATIONS

"747-400/-400ER, 416 passengers," Boeing Interior Arrangement, copyright 1995-2013, 1 pages, accessed Mar. 25, 2013, http://www.boeing.com/boeing/commercial/747family/pf/pf_seating_charts.page.

"Cabin Layout & Comfort," Airbus, A340-600, copyright 2013, 2 pages, accessed Mar. 25, 2013http://www.airbus.com/aircraftfamilies/passengeraircraft/a340family/a340-600/cabin-layout/.

"Onboard Well Being," Airbus, A380, copyright 2013, 3 pages, accessed Mar. 25, 2013http://www.airbus.com/aircraftfamilies/passengeraircraft/a380family/onboard-well-being/.

"The Tupolev Tu-154," Airliners.net, copyright 2013, accessed Mar. 25, 2013, 3 pages,http://www.airliners.net/aircraft-data/stats.main?id=376.

Kozel, Scott, Metrorail Car Interior, 4 Photos, Jan. 2001, 4 pages, accessed Mar. 25, 2013,http://www.roadstothe future.com/Metrorail_Car_Interior.html.

Office Action, dated Mar. 12, 2015, regarding U.S. Appl. No. 13/236,904, 24 pages.

Notice of Allowance, dated Jul. 10, 2015, regarding U.S. Appl. No. 13/236,904, 7 pages.

* cited by examiner

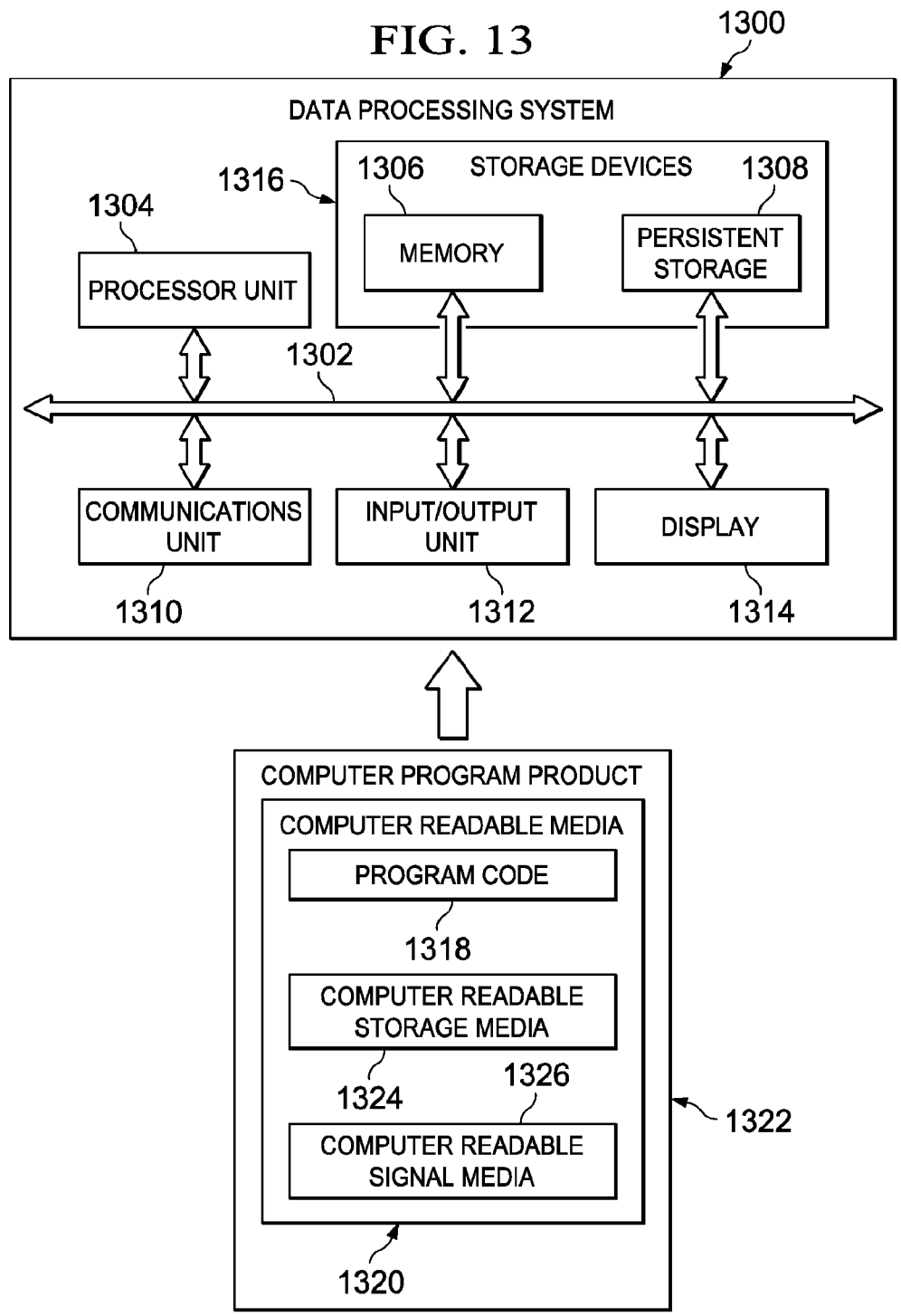

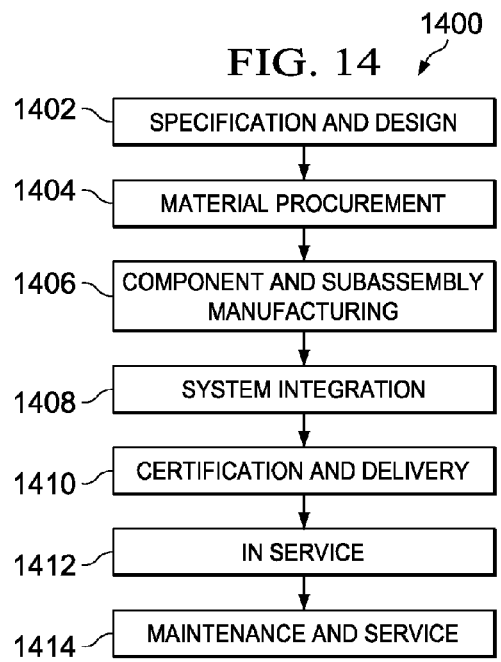
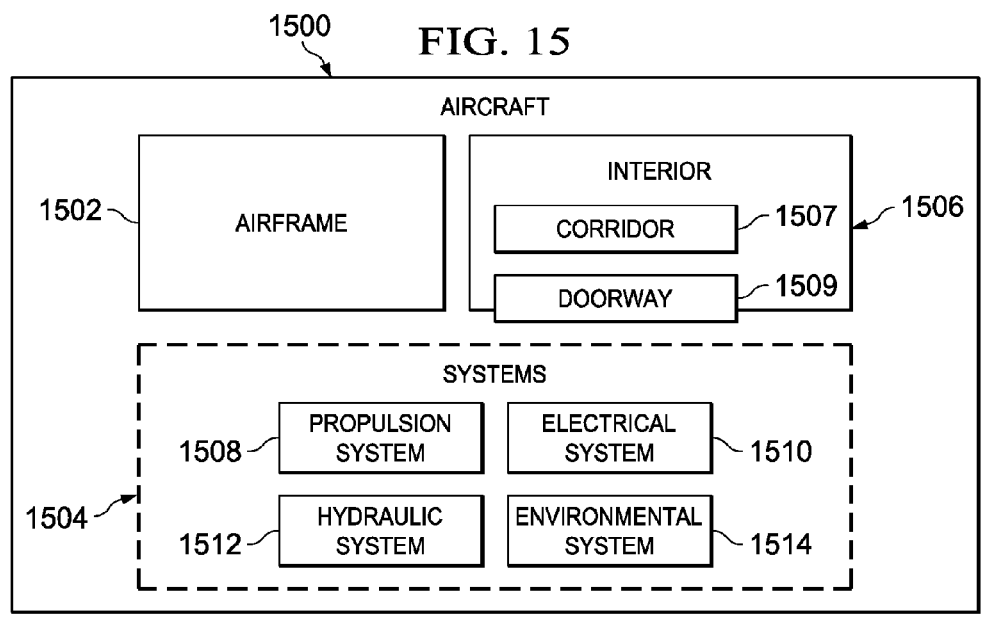

DUAL BOARDING SYSTEM FOR AIRCRAFT

CROSS-REFERENCE TO RELATED APPLICATION(S)

This application is a divisional of, and claims the benefit of priority to, U.S. patent application Ser. No. 13/236,904, filed Sep. 20, 2011, and Notice of Allowance issued Jul. 10, 2015; the entire contents of which are incorporated herein by reference.

BACKGROUND INFORMATION

1. Field

The present disclosure relates generally to aircraft and, in particular, to passenger flow control systems for aircraft. Still more particularly, the present disclosure relates to a method and apparatus for boarding passengers onto and deplaning passengers from an aircraft.

2. Background

Commercial aircraft often may include a passenger cabin. This passenger cabin may be a section of the aircraft with seats in which passengers travel. In commercial passenger aircraft, a passenger cabin may be divided into several parts.

Seats within the passenger area may be arranged in different groupings. These groupings may be defined by seats arranged in rows. One or more aisles also may be present in the aircraft to further divide the seats into the groupings. Further, different passenger areas for different classes of travel may be present for different groupings of seats. The amount of space provided per passenger may increase with the presence of a higher class of travel, such as first class or business class as compared to economy class.

Configurations of seats may be made with a goal of increasing the density of passengers in a cabin. As the number of passengers that can be seated increases, time for boarding and/or disembarking of passengers from an aircraft may be a factor taken into account when operating the aircraft.

The time needed for passengers to board and/or disembark an aircraft may be greater than desired. Reducing the amount of time needed to load and/or unload passengers may be desirable. By reducing the amount of time needed to load and/or unload passengers, the amount of time needed between flights may be decreased. As a result of reduced time between flights, an aircraft also may fly more flights during a day through the reduction of time at the gate.

The effect of reduced gate time on increasing availability of aircraft for additional flights may increase as the size of the aircraft decreases. Typically, smaller aircraft may be used for shorter flights and perform more flights during a day than larger aircraft. Some factors involved in reducing the amount of time at the gate may be the amount of fuel and cargo that are loaded and unloaded.

With the smaller aircraft performing more flights, the amount of fuel and cargo needed may be reduced. Further, with the smaller aircraft, loading other items such as meals may be unnecessary as compared to larger aircraft.

Therefore, it would be advantageous to have a method and apparatus that takes into account at least some of the issues discussed above as well as possibly other issues.

SUMMARY

In one advantageous embodiment, a method for boarding an aircraft is provided. Passengers may be lined up in a first line and a second line relative to a doorway for the aircraft. A flow of the passengers in the first line and the second line may be controlled through the doorway and a corridor connecting the doorway to an interior of the aircraft. The flow of the passengers may pass through a number of spaces in the corridor. The number of spaces may be reserved for a number of crew members during an emergency operation in which the passengers exit the aircraft.

In another advantageous embodiment, a method for controlling a flow of passengers boarding an aircraft is provided. The passengers may be lined up in a first line and a second line relative to a doorway for the aircraft. The flow of the first line and the second line of the passengers may be controlled through the doorway into the aircraft. The doorway may be configured to allow at least one of a dual staggered entry and a dual entry of the passengers in the first line and the second line through the doorway. The flow of the passengers in the first line and the second line may be controlled through a corridor connecting the doorway to a first aisle and a second aisle in an interior of the aircraft. The corridor may have a first width and a second width of the doorway that are each about 60 inches. The first width of the doorway may be configured to allow two of the passengers to pass through the doorway substantially side-by-side in which the passengers may be within about a $97.5^{th}$ percentile with respect to size. The flow of the passengers may be at least one of a dual staggered flow and a dual flow of the passengers and passes through a number of spaces in the corridor. The number of spaces may be reserved for a number of crew members during an emergency operation in which the passengers exit the aircraft. The number of spaces may comprise a first space and a second space that may be specified by a regulatory agency. The first space and the second space may have a third width of about 12.25 inches and a depth of about 20.50 inches and may be located substantially adjacent to one of a first wall and a second wall defining the corridor.

In yet another advantageous embodiment, a passenger flow control system may comprise a doorway in an aircraft, a corridor inside the aircraft, and a number of spaces in the corridor. The doorway in the aircraft may be configured to allow passengers arranged in two lines outside of the doorway of the aircraft to enter the aircraft through the doorway. The corridor inside the aircraft may connect the doorway to an interior of the aircraft. The number of spaces in the corridor may be configured such that a flow of the passengers passes through the number of spaces in the corridor. The number of spaces may be reserved for a number of crew members during an emergency operation in which the passengers exit the aircraft.

In yet another advantageous embodiment, a passenger flow control system for an aircraft may comprise a doorway in the aircraft, a corridor inside the aircraft, and a number of spaces in the corridor. The doorway in the aircraft may be configured to allow passengers arranged in two lines outside of the doorway of the aircraft to enter the aircraft. The doorway into the aircraft may be configured to allow at least one of a dual staggered entry and a dual entry of the passengers in a first line and a second line through the doorway. A first width of the doorway may be configured to allow two of the passengers to pass through the doorway substantially side-by-side in which the passengers may be within about a $97.5^{th}$ percentile with respect to size. The corridor inside the aircraft may connect the doorway to a first aisle and a second aisle in an interior of the aircraft. A first wall and a second wall may define a first width of the corridor. The first width of the corridor and a second width of the doorway may each be about 60 inches. The number of spaces in the corridor may be configured such that a flow of the passengers passes through the number of spaces in the corridor. The number of spaces may be reserved for a number of crew members during an emergency operation in which the passengers exit the aircraft. The flow of the passengers may be at least one of a dual staggered flow and a dual flow of the passengers. The number of spaces may comprise a first space and a second space that may be specified by a regulatory agency. The first space and the second space each may have a width of about 12.25 inches and a depth of about 20.50 inches and each may be located substantially adjacent to one of the first wall and the second wall defining the corridor.

In yet another advantageous embodiment, a method for managing movement of passengers is provided. A first flow of the passengers in a first line at a doorway is controlled through the doorway and a corridor connecting the doorway to an interior of an aircraft. The first flow of the passengers passes through a number of spaces in the corridor in which the number of spaces is reserved for a number of crew members during an emergency operation in which the passengers exit the aircraft. A second flow of the passengers is controlled from the interior of the aircraft through the corridor to the doorway. The second flow of the passengers passes through the number of spaces in the corridor to exit the aircraft in a second line outside of the aircraft.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof will best be understood by reference to the following detailed description of an advantageous embodiment of the present disclosure when read in conjunction with the accompanying drawings, wherein:

FIG. 13 is an illustration of a data processing system in accordance with an advantageous embodiment;

FIG. 14 is an illustration of an aircraft manufacturing and service method in accordance with an advantageous embodiment; and FIG. 15 is an illustration of an aircraft in which an advantageous embodiment may be implemented.

DETAILED DESCRIPTION

Figure 1:
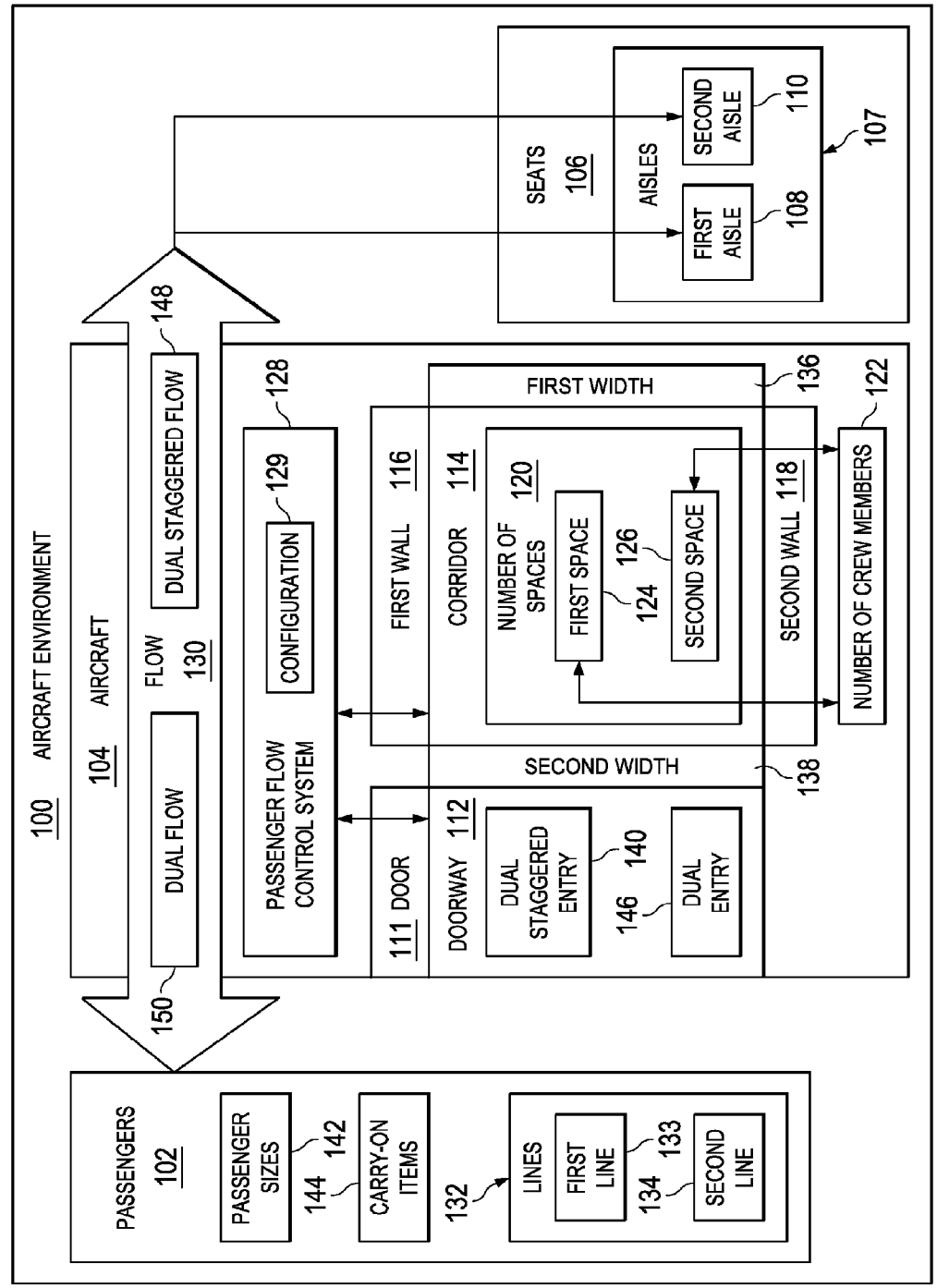
FIG. 1 is an illustration of an aircraft environment in accordance with an advantageous embodiment.

The different advantageous embodiments recognize and take into account one or more different considerations. For example, the different advantageous embodiments recognize and take into account that with boarding aircraft, the configuration of the aircraft may affect the time needed for passengers to reach their seats on an aircraft. For example, as the length of an aisle in the aircraft increases, backups in passengers along the aisle may occur more frequently. For example, the different advantageous embodiments recognize and take into account that passengers may stop to place carry-on luggage in overhead bins.

Further, the different advantageous embodiments also recognize and take into account that one manner in which loading may be made more efficient is to perform loading in groups based on locations in the aircraft or the design of the aircraft itself. For example, passengers with seat assignments near the rear of the aircraft may be allowed to board first with those having seats in the forward part of the aircraft boarding last. Additionally, aircraft with aft boarding stairs may be used for boarding simultaneously through two separate doors, one forward and one aft. This type of boarding may result in congestion between passengers meeting in aisles in locations between the doors. Even with this type of loading of passengers, backups still may occur in an aisle.

The different advantageous embodiments also recognize and take into account that in some aircraft, more than one aisle may be present. For example, an aircraft may have two aisles that allow for passengers to reach their seats more quickly through those aisles as compared to a single aisle. The different advantageous embodiments recognize and take into account that although two aisles may provide for quicker boarding of passengers, entry into the aircraft to reach those aisles may still be a source of congestion.

The different advantageous embodiments recognize and take into account that the time needed to board passengers into aircraft may be reduced by loading passengers using more than one door. A door closer to the front of the aircraft may be used to allow passengers to enter the aircraft down one aisle while a second door located farther to the aft portion of the aircraft may be used to allow passengers to enter and find seats using a second aisle in the aircraft.

The different advantageous embodiments also recognize and take into account that if two aisles are used, boarding of passengers through a single door may occur from both aisles with the use of a larger doorway. The different advantageous embodiments recognize and take into account that the width of the door, as well as the width of the doorway, may be increased to allow substantially two passengers to enter the aircraft at substantially the same time.

This type of boarding may be considered dual boarding or dual staggered boarding of passengers. With staggered dual boarding, some passengers may enter side-by-side while other passengers may enter in a more staggered fashion into the aircraft through the doorway.

The different advantageous embodiments recognize and take into account that in addition to having a doorway with a desired width for dual boarding, the corridor leading to the aisles also may have a width to allow for passengers to walk substantially side-by-side or in a staggered fashion in some cases.

The different advantageous embodiments recognize and take into account that currently available aircraft doorways for passengers may be unable to accommodate dual entry by passengers. In these illustrative examples, dual entry may occur when two passengers are able to walk side-by-side through a doorway in the aircraft.

The different advantageous embodiments recognize and take into account that most designers designing aircraft and loading systems for aircraft may not have taken into account federal aviation requirements regarding the space inside the doorway in a correct manner. The different advantageous embodiments recognize and take into account that space inside the doorway prior to reaching the aisles may be reserved for use by crew members.

This space may be defined by federal aviation requirements set out by the Federal Aviation Administration. The different advantageous embodiments recognize and take into account that this space inside the doorway may not be used by passengers during some emergency situations.

The different advantageous embodiments recognize and take into account, however, that the space inside the doorway may be used by passengers during normal boarding and does not need to be reserved for crew members during this process. The different advantageous embodiments recognize and take into account that this space inside the doorway may be used during normal boarding.

As a result, the different advantageous embodiments recognize and take into account that the use of wider doorways for dual entry may not have been used because of a failure to take into account that the spaces reserved for emergency situations may be used during normal boarding. As a result, the different advantageous embodiments recognize and take into account that designers may not desire to move walls in a corridor to provide additional space in addition to the reserved spaces for use by passengers boarding the aircraft. The different advantageous embodiments recognize and take into account that increasing the widths of corridors may result in reducing the number of seats that can be placed in an aircraft.

By recognizing that the space may be used for normal boarding operations, the different advantageous embodiments provide a method and apparatus for controlling the flow of passengers through a doorway into an aircraft in which the passengers may be arranged in two lines outside of the doorway in which the doorway is configured to allow at least a dual staggered entry of passengers through the doorway. These two lines may be next to each other outside of the door way. The flow of passengers may be controlled through a corridor connecting the doorway to a first aisle and a second aisle in the interior of the aircraft. The flow of the passengers may pass through a number of spaces in the corridor in which the number of spaces may be reserved for a number of crew members during an emergency operation in which passengers exit the aircraft.

With reference now to the figures, and in particular, with reference first to FIG. 1, an illustration of an aircraft environment is depicted in accordance with an advantageous embodiment. In this illustrative example, aircraft environment 100 may be an environment in which passengers 102 may enter and exit aircraft 104.

In this illustrative example, aircraft 104 may have seats 106. Aisles 107 may be present and may provide access to seats 106. In this illustrative example, aisles 107 may comprise first aisle 108 and second aisle 110. First aisle 108 and second aisle 110 may extend longitudinally through aircraft 104 between seats 106.

Aircraft 104 may have door 111 with doorway 112. Passengers 102 may reach seats 106 by entering aircraft 104 through doorway 112 in aircraft 104 when door 111 is open. First aisle 108 and second aisle 110 may be reached from doorway 112 through corridor 114.

Corridor 114 may be in part defined by first wall 116 and second wall 118. In these illustrative examples, these walls may take the form of bulkheads for aircraft 104.

Within corridor 114, number of spaces 120 may be present. Number of spaces 120 may be spaces reserved for use during emergency operations. In other words, number of spaces 120 may be required to be clear for use by number of crew members 122 during an emergency exit from aircraft 104. Number of spaces 120 may be defined by a regulatory agency and/or other organizations. For example, the regulatory agency may be the Federal Aviation Administration.

In this illustrative example, number of spaces 120 may comprise first space 124 and second space 126. First space 124 may be located by first wall 116 and second space 126 may be located by second wall 118.

In this illustrative example, passenger flow control system 128 may be implemented to load passengers 102 onto aircraft 104. In these illustrative examples, passenger flow control system 128 may be configuration 129 of at least one of doorway 112 and corridor 114.

As used herein, the phrase "at least one of", when used with a list of items, means different combinations of one or more of the listed items may be used and only one of each item in the list may be needed. For example, "at least one of item A, item B, and item C" may include, for example, without limitation, item A, or item A and item B. This example also may include item A, item B, and item C, or item B and item C.

Passenger flow control system 128 may operate to control flow 130 of passengers 102 onto aircraft 104. Flow 130 of passengers 102 may be controlled to move passengers through doorway 112 into corridor 114 and then through first aisle 108 and second aisle 110 to reach seats 106 in these illustrative examples. In these illustrative examples, corridor 114 may be a cross-aisle leading to first aisle 108 and second aisle 110.

In these illustrative examples, passengers 102 may be arranged in lines 132 outside of aircraft 104. In particular, passengers 102 may be arranged in two lines, first line 133 and second line 134. Flow 130 of passengers 102 in first line 133 and second line 134 onto aircraft 104 may be controlled using at least one of doorway 112 and corridor 114. In this example, a partition between first line 133 and second line 134 may be absent.

With passenger flow control system 128, corridor 114 may have first width 136 and doorway 112 may have second width 138. First width 136 and second width 138 may be substantially the same in these illustrative examples.

As depicted, doorway 112 may be configured to allow at least dual staggered entry 140 of passengers 102. Depending on passenger sizes 142 and/or carry-on items 144 for passengers 102, doorway 112 may allow for dual entry 146 of passengers 102.

In the illustrative examples, flow 130 of passengers 102 also may be controlled through corridor 114 by passenger flow control system 128. The control of flow 130 of passengers 102 through corridor 114 may be such that flow 130 of passengers 102 passes through number of spaces 120 in corridor 114. In other words, number of spaces 120 may be located in corridor 114 between first wall 116 and second wall 118. With first width 136 being substantially equal to second width 138, flow 130 of passengers 102 may pass through number of spaces 120. In this manner, flow 130 of passengers 102 may pass through doorway 112 and corridor 114 with reduced congestion or bottlenecks.

As depicted, flow 130 of passengers 102 may be dual staggered flow 148, dual flow 150, or a combination of the two. Dual flow 150 may be present depending on passenger sizes 142 and/or carry-on items 144.

Dual flow 150 may be present when passengers 102 pass through at least one of doorway 112 and corridor 114 side-by-side. If passengers 102 are offset from each other rather than side-by-side, flow 130 may be dual staggered flow 148. In other words, when passenger sizes 142 are large enough for passengers 102 and/or carry-on items 144 are large enough, dual flow 150 may be present instead of dual staggered flow 148.

In these illustrative examples, first width 136 and/or second width 138 may be a usable width for these components. For example, the actual width of doorway 112 may be larger than second width 138. This difference may take into account components for door 111 that may partially block doorway 112. For example, a hinge for door 111 may partially block space in doorway 112 when door 111 is in an open position. As a result, second width 138 may be designed to be substantially equal to first width 136 by taking into account these factors.

With doorway 112 configured for dual staggered entry 140, dual entry 146, or both, passengers 102 may enter aircraft 104 through doorway 112 more quickly as compared to currently used doors that may not allow for this type of entry. Further, with corridor 114 being configured to control flow 130 of passengers 102 to pass through number of spaces 120 in corridor 114, congestion of passengers 102 traveling to seats 106 may be reduced.

In particular, flow 130 of passengers 102 through corridor 114 to first aisle 108 and second aisle 110 may occur more quickly. With passenger flow control system 128, the amount of time that aircraft 104 spends at a gate may be reduced. The reduction of this time may allow for increased number of flights. Passenger flow control system 128 may be especially useful when aircraft 104 is used to perform shorter flights. For example, passenger flow control system 128 may be especially useful on a short- to medium-range aircraft.

In these illustrative examples, a short flight may be one that is from about one hour to about two hours long. Airlines that operate aircraft using shorter flights may benefit greatly from using passenger flow control system 128. For example, if the time between flights at a gate is reduced by about 10 minutes, about six flights may result in a savings of about 60 minutes. This reduction in time may leave sufficient time for an additional flight in the same day. The additional flight may provide additional desired revenues for the same aircraft.

The illustration of aircraft environment in FIG. 1 is not meant to imply physical or architectural limitations to a manner in which an advantageous embodiment may be implemented. Other components in addition to and/or in place of the ones illustrated may be used. Some components may be unnecessary. Also, the blocks are presented to illustrate some functional components. One or more of these blocks may be combined and/or divided into different blocks when implemented in an advantageous embodiment.

For example, in one or more advantageous embodiments, passenger flow control system 128 also may be used to control the flow of passengers 102 from seats 106 out of aircraft 104.

In still other advantageous embodiments, aircraft 104 may have more than one level in which seats are located. These additional seats may be seats in addition to seats 106. The flow of passengers may be controlled in a similar fashion or through other mechanisms depending on the particular implementation.

In yet another illustrative example, another doorway may be present in which passengers may enter and reach first aisle 108 and second aisle 110. In still other illustrative examples, another door may be present to reach another set of aisles. This set of aisles may be for seats in a different class of seating as compared to seats 106.

In this manner, an advantageous embodiment may be used to manage flow 130 of passengers 102 in a manner that may reduce the amount of time needed to board passengers 102. By reducing the amount of time needed to board passengers 102, the time that aircraft 104 may need to be at a gate may be reduced. In this manner, with some types of aircraft and types of flights, an increased number of flights may be performed by the same aircraft. As a result, revenues generated by a particular aircraft also may be increased with the use of aircraft environment 100.

Figure 2:
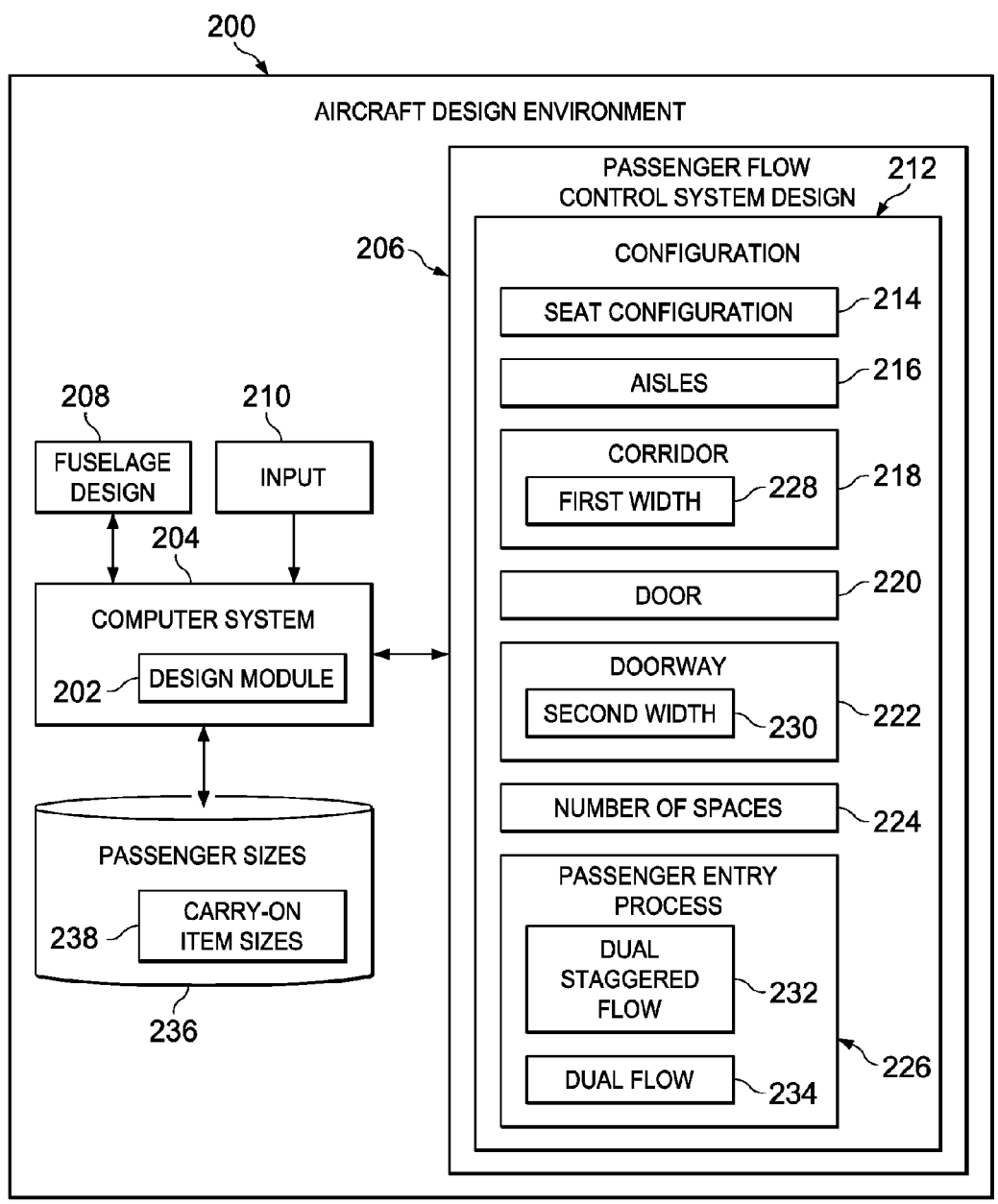
FIG. 2 is an illustration of a design environment for designing passenger flow control systems in accordance with an advantageous embodiment.

With reference now to FIG. 2, an illustration of a design environment for designing passenger flow control systems is depicted in accordance with an advantageous embodiment. Aircraft design environment 200 may be an example of a design environment that may be used to design different components for aircraft 104 shown in block form in FIG. 1. In these illustrative examples, aircraft design environment 200 may be used for aircraft 104 and/or components such as passenger flow control system 128 in FIG. 1.

As depicted, design module 202 may be located in computer system 204. Design module 202 may be implemented using software, hardware, or a combination of the two. Computer system 204 may comprise a number of computers. When more than one computer is present in computer system 204, those computers may be in communication with each other using a medium, such as a network.

As depicted, design module 202 may generate passenger flow control system design 206 based on input 210. Passenger flow control system design 206 may be used to implement a passenger flow control system, such as passenger flow control system 128 in FIG. 1.

Passenger flow control system design 206 may be generated by taking into account fuselage design 208 in these illustrative examples. In other illustrative examples, passenger flow control system design 206 may affect the design of fuselage design 208.

As depicted, input 210 may specify various goals and parameters. For example, without limitation, input 210 may include passenger density, number of passengers, aircraft size, desired time to seat passengers, desired time to deplane passengers, and other suitable types of input.

With input 210, design module 202 may generate configuration 212 for passenger flow control system design 206. Configuration 212 may include, for example, at least one of seat configuration 214, aisles 216, corridor 218, door 220, doorway 222, number of spaces 224, passenger entry process 226, and other suitable components for the aircraft.

In these illustrative examples, seat configuration 214 may be an arrangement of seats within an aircraft. Aisles 216 may identify the location of aisles relative to seats. Corridor 218 may be an identification of a space connecting the doorway to the aisles. Number of spaces 224 may be spaces reserved for use by crew members during emergency operations. Passenger entry process 226 may be the process for how passengers enter the aircraft.

Corridor 218 may have first width 228 in these illustrative examples. Doorway 222 may have second width 230. In these illustrative examples, first width 228 and second width 230 may be selected to be substantially equal to each other. Further, first width 228 and second width 230 may be selected to provide for dual staggered flow 232, dual flow 234, or a combination of the two in passenger entry process 226.

The selection of values for first width 228 and second width 230 may be based on passenger sizes 236 and/or carry-on item sizes 238. For example, without limitation, values for these widths may be selected to allow passenger sizes 236 to pass through doorway 222 and/or corridor 218 with dual flow 234.

Passenger sizes 236 include the passenger sizes that are within about a 97.5$^{th}$ percentile for passenger sizes. In these illustrative examples, passenger sizes 236 within about the 97.5$^{th}$ percentile for passenger sizes may include the passengers sizes that are smaller than about the largest 2.5 percent of the passenger sizes. In particular, the largest 2.5 percent may be with respect to male passenger sizes.

In these illustrative examples, passenger sizes 236 may be with respect to height. For example, without limitation, two passengers having a height up to about the largest 2.5 percent of male heights may be allowed to pass through doorway 222 and corridor 218 side-by-side in dual flow 234. With passenger sizes larger than the 97.5$^{th}$ percentile, passengers may pass through doorway 222 and corridor 218 using dual staggered flow 232.

Of course, other factors may be used when selecting values for first width 228 for corridor 218 and second width 230 for doorway 222. As another example, these values may be selected based on allowing for dual flow 234 when a selected size for carry-on items in carry-on item sizes 238 is present.

In these illustrative examples, passenger flow control system design 206 may be generated for new aircraft, for reconfiguring current aircraft, and for other suitable purposes.

Figure 3:
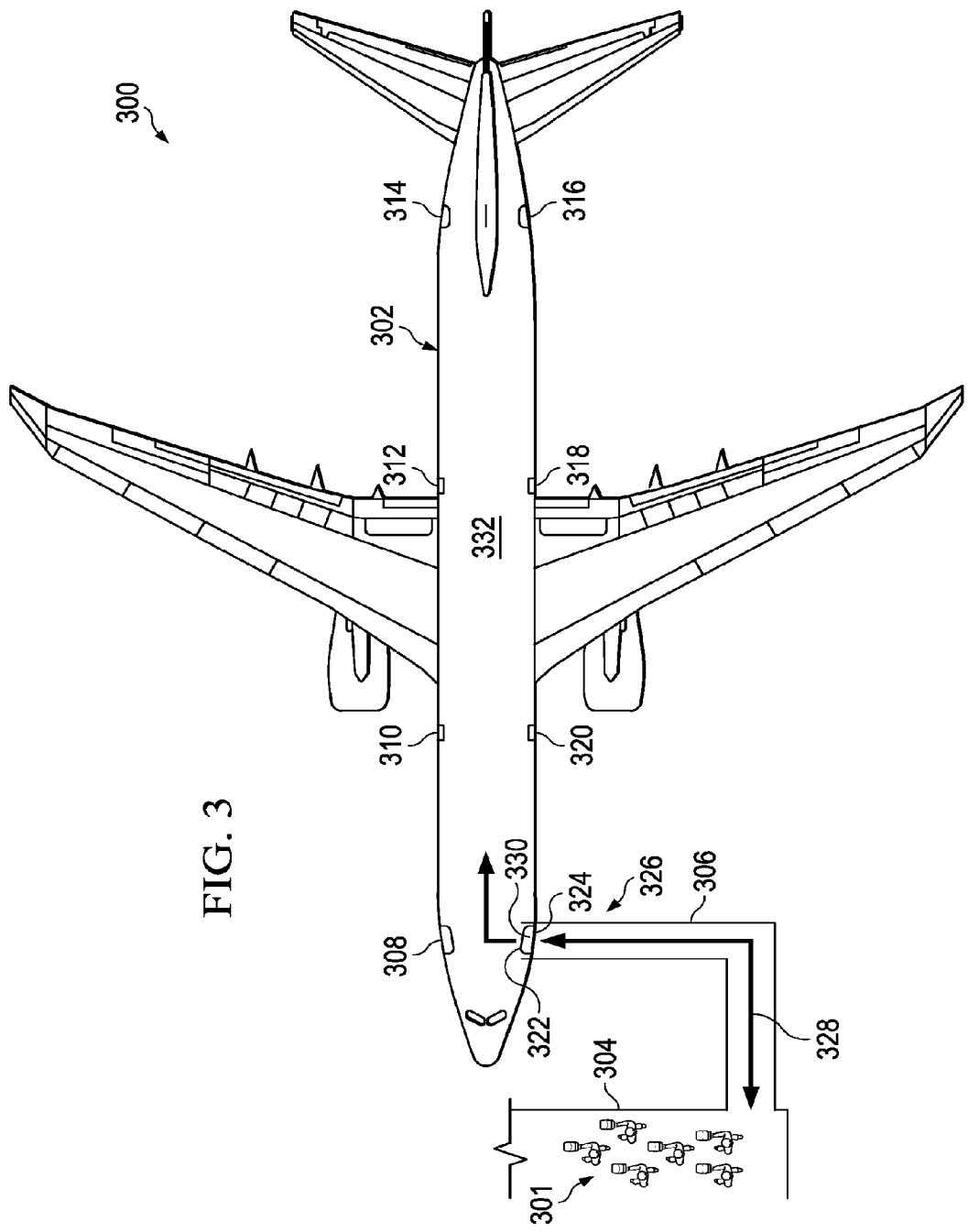
FIG. 3 is an illustration of an aircraft environment in accordance with an advantageous embodiment.

With reference to FIG. 3, an illustration of an aircraft environment is depicted in accordance with an advantageous embodiment. Aircraft environment 300 in FIG. 3 may be an example of a physical implementation for aircraft environment 100 shown in block form in FIG. 1.

Aircraft environment 300 may include aircraft 302 located at gate 304. In this illustrative example, passengers 301 may board aircraft 302 from gate 304 through walkway 306. Walkway 306 may be a structure configured to provide passengers access to aircraft 302 from gate 304 in a manner that may protect passengers from the environment. Walkway 306 may be, for example, without limitation, a jet bridge, a passenger walkway, a passenger boarding bridge, a loading bridge, a passenger stairway, a passenger ramp, and other suitable platforms.

As depicted, aircraft 302 may have doors 308, 310, 312, 314, 316, 318, 320, and 322. Walkway 306 may be positioned relative to door 322 in this illustrative example.

Passengers 301 may enter aircraft 302 by moving through walkway 306 and into aircraft 302 through doorway 324 for door 322. In these illustrative examples, entering aircraft 302 may be referred to as "boarding" aircraft 302.

In a similar fashion, passengers 301 may leave aircraft 302 by moving from interior 332 through corridor 330 and out into walkway 306 through doorway 324. Leaving aircraft 302 may be referred to as "disembarking" aircraft 302 in the depicted examples.

In these illustrative examples, passenger flow control system 326 may be implemented with aircraft 302 to decrease the amount of time needed for passengers 301 to board aircraft 302, disembark aircraft 302, or a combination of the two. In this illustrative example, passenger flow control system 326 may control flow 328 of passengers 301 that enter aircraft 302 through doorway 324 and through corridor 330 in interior 332 of aircraft 302.

Figure 4:
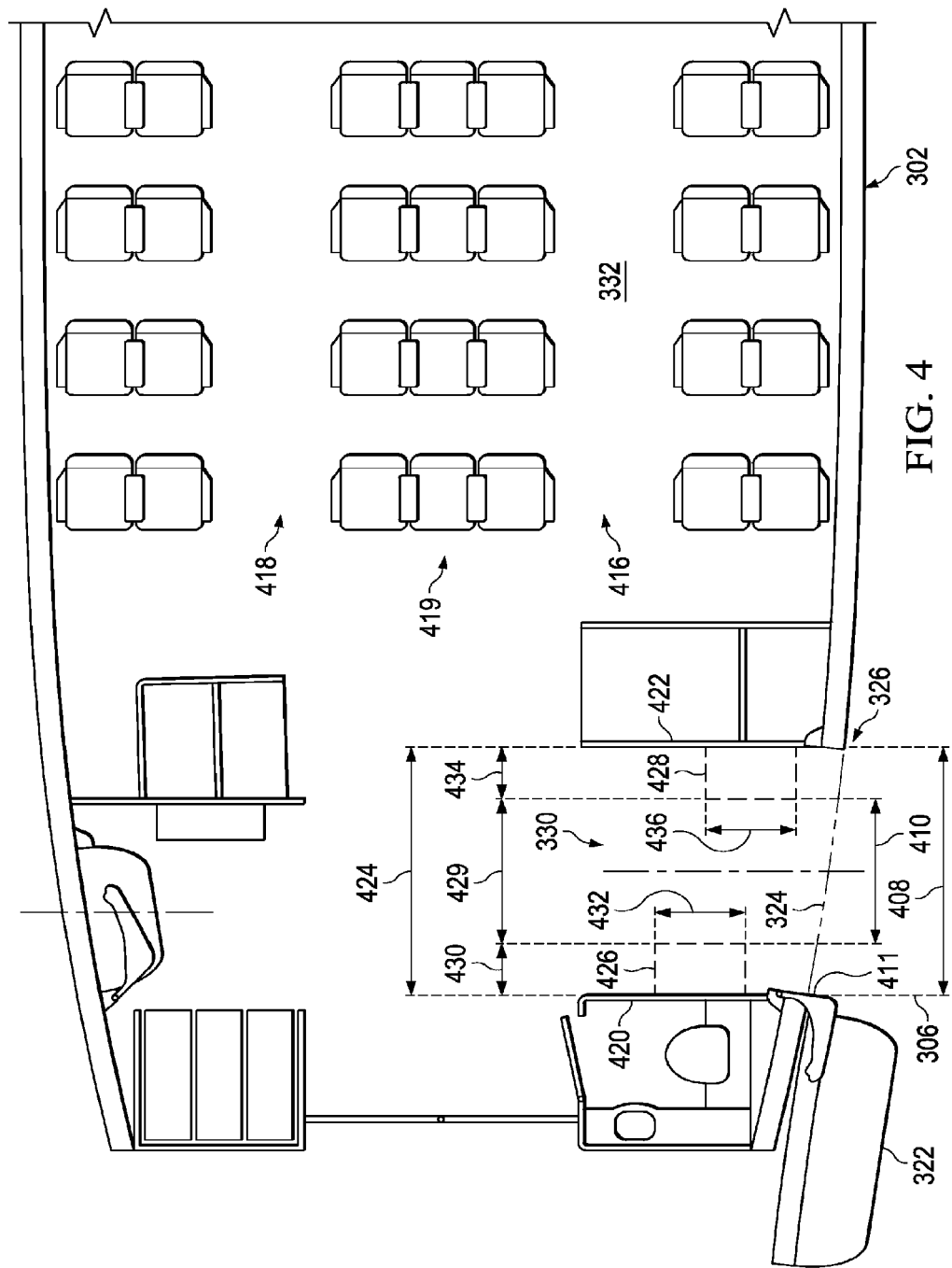
FIG. 4 is an illustration of a portion of an aircraft incorporating a passenger flow control system in accordance with an advantageous embodiment.

With reference now to FIG. 4, an illustration of a portion of an aircraft incorporating a passenger flow control system is depicted in accordance with an advantageous embodiment. A more detailed view of aircraft 302 with passenger flow control system 326 in FIG. 3 is depicted in this partially exposed view. Passenger flow control system 326 may comprise doorway 324 and/or corridor 330.

Doorway 324 may have width 408 or width 410. In these illustrative examples, width 408 may be selected when dual staggered entry, dual entry, or some combination of the two is desired for entry into interior 332 of aircraft 302. In these illustrative examples, width 408 may be about 60 inches while width 410 may be about 42 inches. These widths may be usable widths through which passengers may pass. As a result, the actual physical width of doorway 324 may be larger than width 408. Width 408 may be the width not blocked by components in doorway 324, such as hinge 411 for door 322. In other words, width 408 may be the usable width of doorway 324 for boarding passengers, deplaning passengers, or a combination of the two.

As depicted, corridor 330 may be located in interior 332 of aircraft 302. Corridor 330 may provide a connection between doorway 324, first aisle 416, and second aisle 418. First aisle 416 and second aisle 418 may provide access to seats 419.

Corridor 330 may be defined in part by first wall 420 and second wall 422. In this illustrative example, corridor 330 may have width 424. In these illustrative examples, width 424 of corridor 330 may be substantially equal to width 408. In this depicted example, width 424 may be about 60 inches.

Width 424, in some cases, may be greater than width 408. However, increasing width 424 for corridor 330 to a value greater than width 408 for doorway 324 may result in an undesired loss of space in interior 332 of aircraft 302 that may not be used for other purposes. For example, a loss in number of seats 419 may occur if width 424 is increased to be greater in size than width 408.

In these illustrative examples, first space 426 may be located substantially adjacent to first wall 420 and second space 428 may be located substantially adjacent to second wall 422. As depicted, first space 426 and second space 428 may be spaces reserved for use by crew members (not shown) during emergency exits. These spaces, however, may not be defined using physical structures. Instead, these spaces may be ones reserved for use by crew members (not shown) that also may not be used by passengers (not shown) during emergency exits of aircraft 302.

As depicted, first space 426 may have width 430 and depth 432. Second space 428 may have width 434 and depth 436. Width 430 and width 434 may each be about 12.25 inches. Depth 432 and depth 436 may each be about 20.5 inches.

Currently, without passenger flow control system 326, doorway 324 may have width 410. Width 410 may be substantially equal to width 429 within corridor 330. Width 429 may exclude width 430 for first space 426 and width 434 for second space 428. With width 410 for doorway 324 and width 429 for corridor 330, only single file entry and single file flow may occur.

By recognizing that first space 426 and second space 428 may be used during entry of passengers (not shown) into aircraft 302, width 408 may be selected for doorway 324 without changing width 424 of corridor 330. As a result, passenger flow control system 326 may move passengers (not shown) through first space 426 and second space 428 in these illustrative examples.

As a result, width 424 of corridor 330 may be designed to have a smaller or smallest value possible to allow for dual staggered entry, dual entry, or a combination of the two through doorway 324. For example, width 424 of corridor 330 may not need to be widened to take into account first space 426 and/or second space 428.

Thus, door 322 with doorway 324 may be selected to have width 408 rather than width 410 without changing width 429 of corridor 330. In this manner, time needed to board and/or deplane aircraft 302 may be reduced without a reduction in seats available for passengers on aircraft 302.

Figure 5:
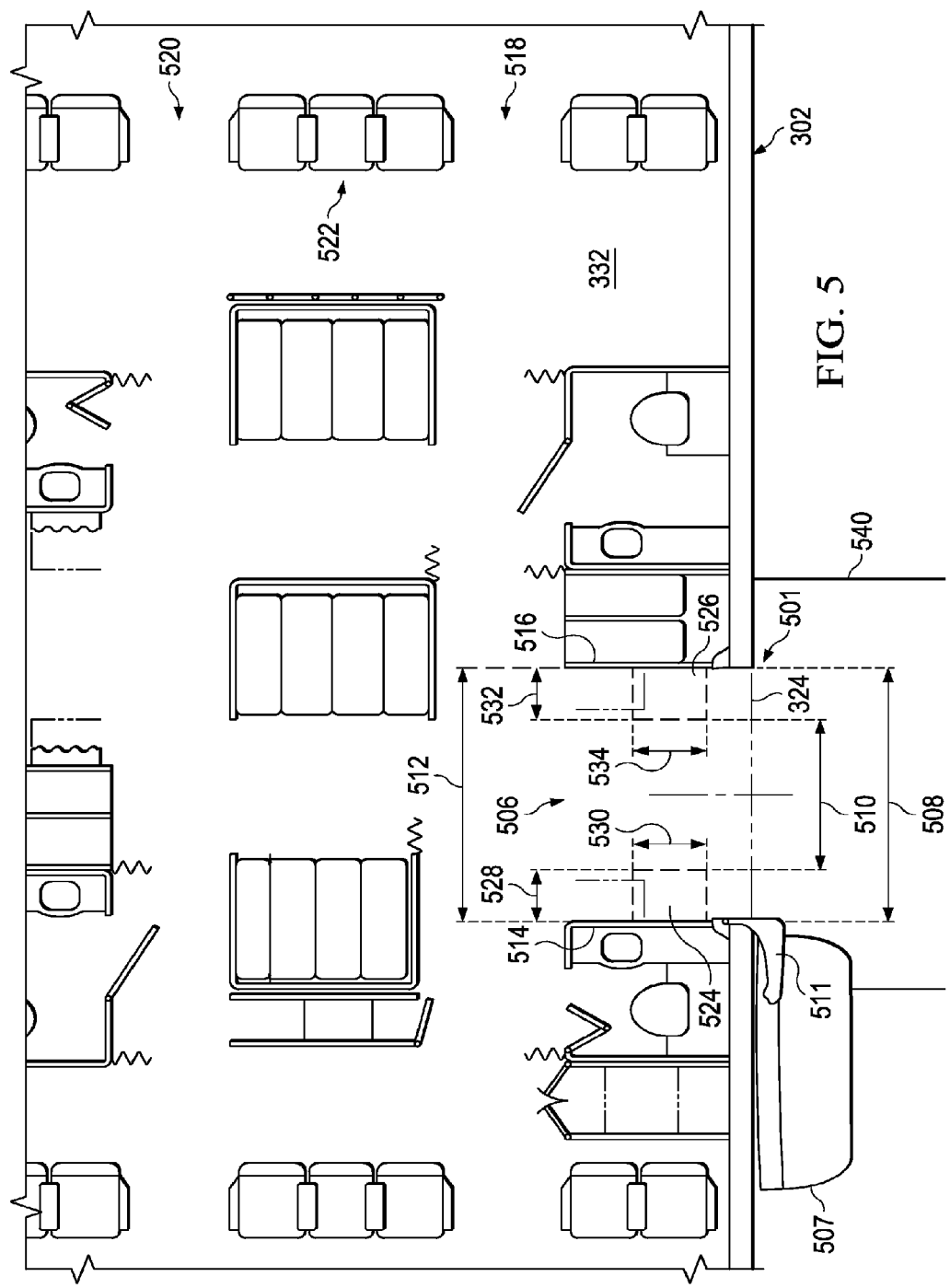
FIG. 5 is an illustration of a passenger flow control system for an aircraft in accordance with an advantageous embodiment.

With reference now to FIG. 5, an illustration of a passenger flow control system for an aircraft is depicted in accordance with an advantageous embodiment. In this illustrative example, passenger flow control system 501 also may be used at doorway 324 of aircraft 302. As depicted, passenger flow control system 501 may comprise at least one of doorway 324 and corridor 506.

Door 507 may be associated with doorway 324. Door 507 is shown in an open position. Doorway 324 may have width 508 rather than width 510. Doorway 324 may lead to corridor 506.

In this illustrative example, corridor 506 may have width 512. Width 512 may be substantially equal to width 508. In these illustrative examples, width 512 and width 508 may have a value of about 60 inches. Width 508 may be a usable width through which passengers may pass. As a result, the actual physical width of doorway 324 may be larger than width 508. Width 508 may be the width not blocked by components in doorway 324, such as hinge 511 for door 507. In other words, width 508 may be the usable width of doorway 324 for boarding passengers, deplaning passengers, or a combination of the two.

Corridor 506 may be defined by first wall 514 and second wall 516. Corridor 506 may connect first aisle 518 and second aisle 520 to doorway 324 in these illustrative examples. First aisle 518 and second aisle 520 may be used to reach seats 522 within aircraft 302.

Within corridor 506, first space 524 and second space 526 may be present. First space 524 may be adjacent to first wall 514. Second space 526 may be adjacent to second wall 516. First space 524 may have width 528 and depth 530. Second space 526 may have width 532 and depth 534. Width 528 and width 532 may each be about 12.25 inches. Depth 530 and depth 534 may each be about 20.5 inches.

As depicted, walkway 540 may be positioned relative to doorway 324. Walkway 540 may provide a path to gate 304 (not shown).

Figure 6:
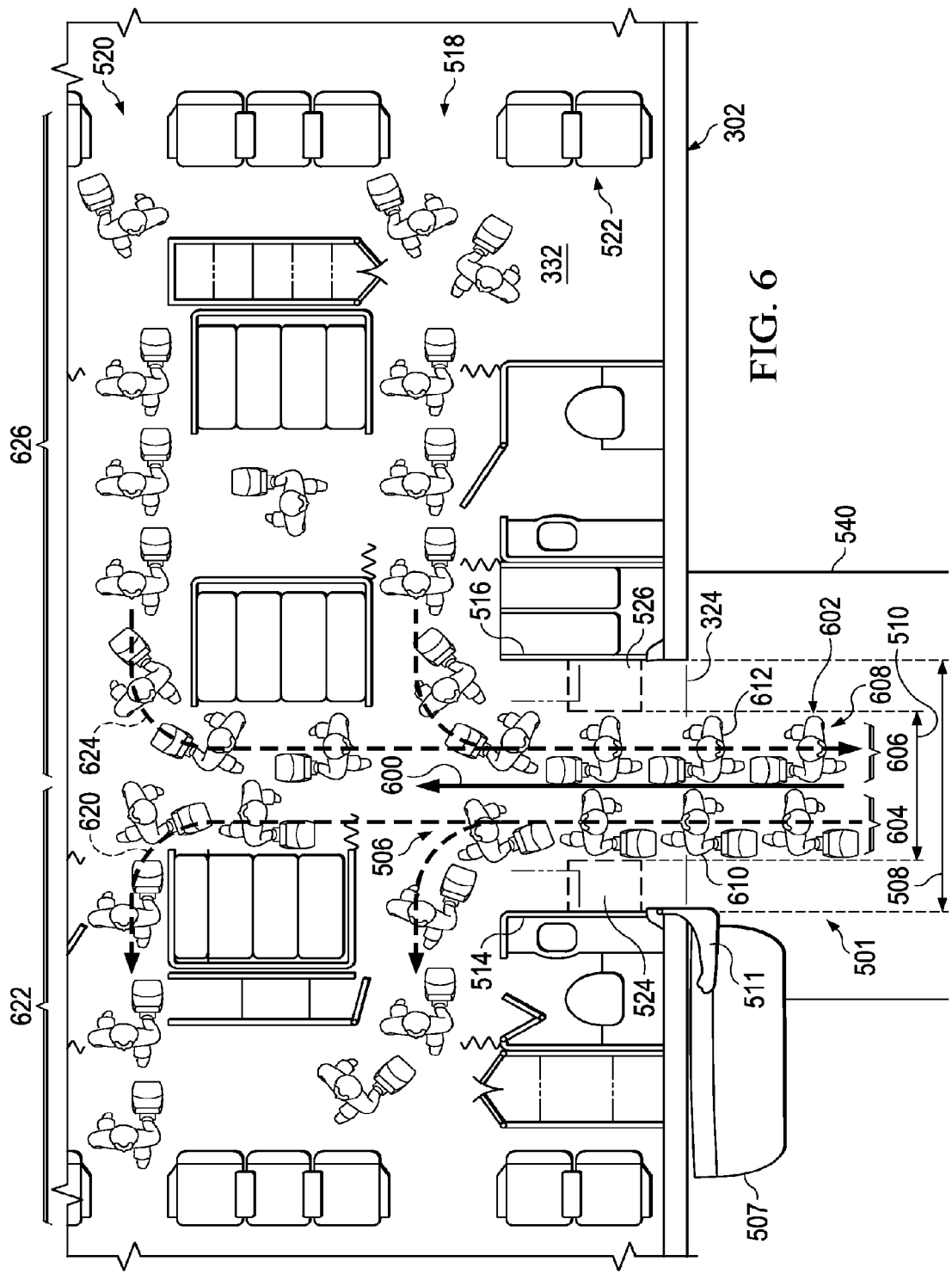
FIG. 6 is an illustration of a flow of passengers boarding an aircraft in accordance with an advantageous embodiment.

Turning now to FIG. 6, an illustration of a flow of passengers boarding an aircraft is depicted in accordance with an advantageous embodiment. In this illustrative example, flow 600 of passengers 602 is depicted.

Flow 600 may begin with first line 604 and second line 606 on walkway 540. First line 604 and second line 606 may be next to each other. In other words, first line 604 and second line 606 may be considered to be parallel lines.

Passengers in first line 604 and second line 606 may enter aircraft 302 through doorway 324 as illustrated by flow 600 of passengers 602. Further, flow 600 may pass through corridor 506 to first aisle 518 and second aisle 520. In this manner, passengers 602 may reach seats 522.

In this illustrative example, flow 600 of passengers 602 may take the form of dual flow 608. In other words, passengers 602 may enter aircraft 302 through doorway 324 side-by-side. This entry through doorway 324 may be a dual entry for doorway 324. Additionally, passengers 602 also may move through corridor 506 in a side-by-side fashion before reaching first aisle 518 and/or second aisle 520. For example, passenger 610 and passenger 612 in passengers 602 may be shown as passing through doorway 324 in a side-by-side fashion.

Flow 600 of passengers 602 is into aircraft 302 in this depicted example. However, in other illustrative examples, flow 600 of passengers 602 may be out of aircraft 302. For example, without limitation, passengers 602 may use dual flow 608 provided by first line 604 and second line 606 to exit aircraft 302.

Further, flow 600 of passengers 602 also may be such that some of passengers 602 enter aircraft 302 while other passengers 602 exit aircraft 302. For example, without limitation, first line 604 of passengers 602 may be located at doorway 324 and enter aircraft 302 as shown by first flow 620 to reach first aisle 518 and second aisle 520 in first section 622 in aircraft 302.

While passengers 602 in first line 604 enter aircraft 302, other passengers in a passengers 602 may move to exit aircraft 302. The movement of these other passengers in second flow 624 from first aisle 518 and second aisle 520 in second section 626 of aircraft 302 may form second line 606 as those passengers exit aircraft 302.

In these examples, first section 622 and second section 626 are relative to corridor 506. In other words, these sections are on either side of corridor 506. Also, these flows may pass through first space 524 and second space 526 in corridor 506.

The sections may be identified differently in other illustrative examples. The sections may be selected as ones to facilitate boarding and exiting processes that may be used or desired for aircraft 302.

Figure 7:
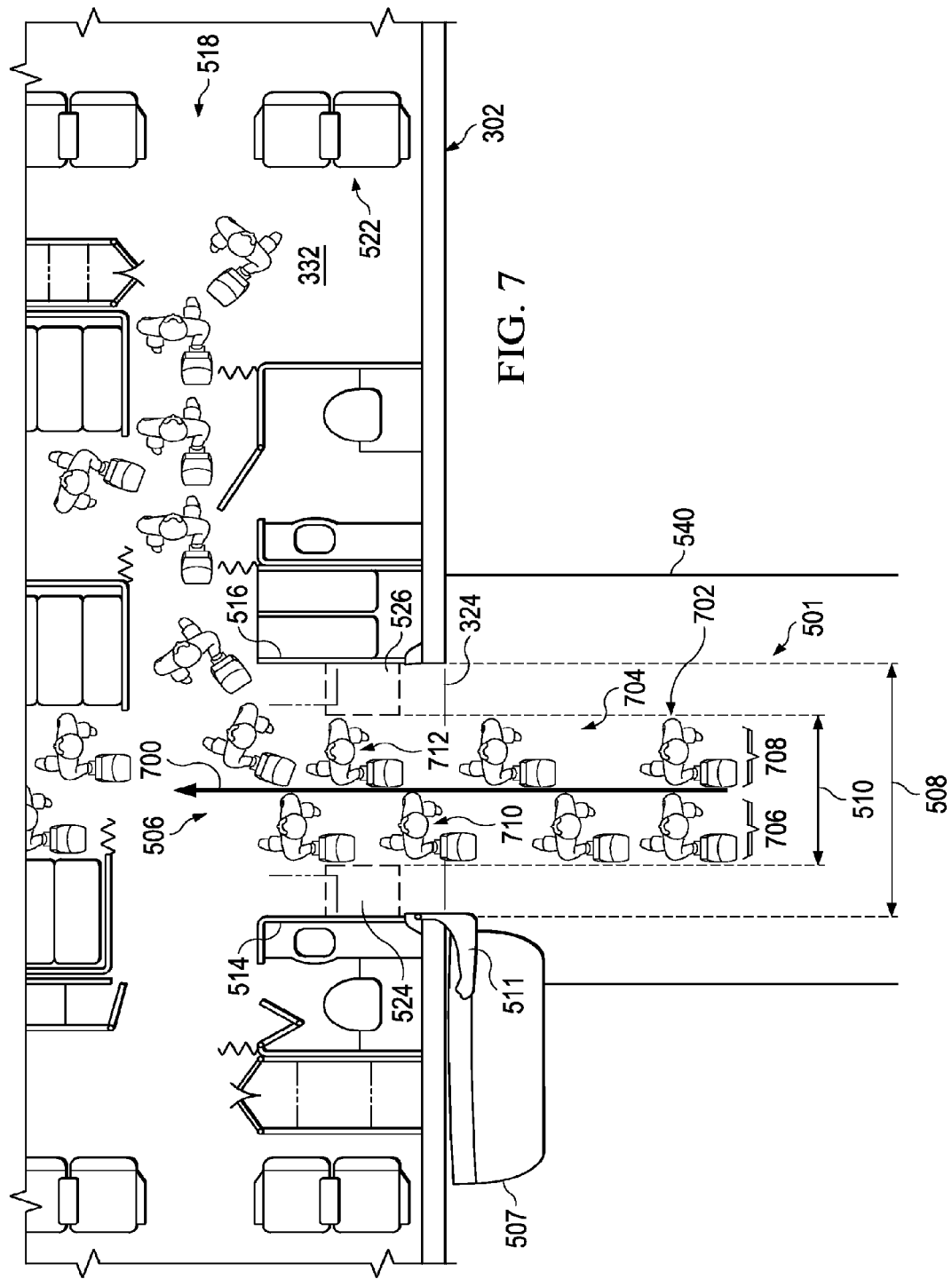
FIG. 7 is an illustration of a flow of passengers boarding an aircraft in accordance with an advantageous embodiment.

With reference now to FIG. 7, an illustration of a flow of passengers boarding an aircraft is depicted in accordance with an advantageous embodiment. In this example, flow 700 of passengers 702 is shown in dual staggered flow 704.

As can be seen, passengers 702 may line up in first line 706 and second line 708. Thereafter, passengers 702 may move in flow 700 through doorway 324 and corridor 506 to first aisle 518 and second aisle 520.

With dual staggered flow 704, passengers 702 may not pass through doorway 324 and/or corridor 506 in a side-by-side fashion. Instead, passengers 702 may be offset from each other. Dual staggered flow 704 through doorway 324 may result in staggered entry through doorway 324 in these illustrative examples. For example, passenger 710 and passenger 712 may pass through doorway 324 in a staggered fashion. Dual staggered flow 704 may be in contrast to a single file flow (not shown) in which passengers 702 may not have sufficient space to be offset from each other.

Flow 700 of passengers 702 is into aircraft 302 in this depicted example. However, in other illustrative examples, flow 700 of passengers 702 may be out of aircraft 302. For example, without limitation, passengers 702 may use dual staggered flow 704 provided by first line 706 and second line 708 to exit aircraft 302.

Further, although dual flow 608 in FIG. 6 and dual staggered flow 704 in FIG. 7 are shown as independent flows with respect to each other, these flows may be combined in actual boarding of passengers 702. For example, both dual flow 608 and dual staggered flow 704 may be present depending on the particular implementation.

Figure 8:
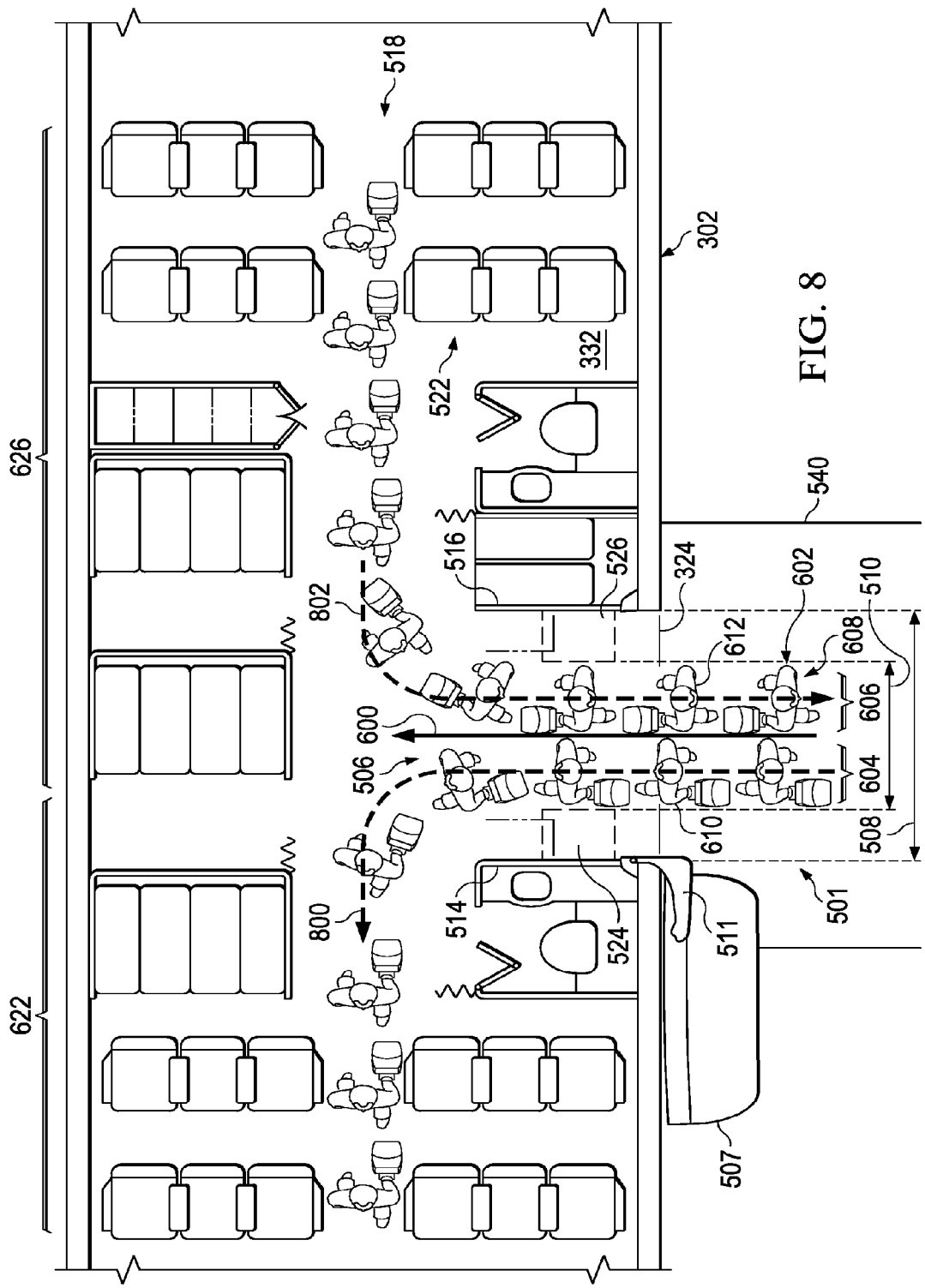
FIG. 8 is an illustration of a passenger flow control system for an aircraft in accordance with an advantageous embodiment.

With reference now to FIG. 8, an illustration of a passenger flow control system for an aircraft is depicted in accordance with an advantageous embodiment. In this illustrative example, flow 600 of passengers 602 from FIG. 6 is depicted in a different configuration of aircraft 302. In this configuration of aircraft 302 in FIG. 8, second aisle 520 from FIGS. 5 and 6 is excluded in aircraft 302. Instead, as depicted, first aisle 518 may be used to reach seats 522 within aircraft 302.

With dual flow 608, passengers 602 in first line 604 may enter first aisle 518 walking in a forward direction, while passengers 602 in second line 606 may enter first aisle 518 walking in an aft direction. In this manner, with dual flow 608, passenger control system 501 may increase passenger flow and thereby reduce passenger boarding times even when only one aisle is present in aircraft 302.

Further, flow 600 of passengers 602 is into aircraft 302 in this depicted example. However, in other illustrative examples, flow 600 of passengers 602 may be out of aircraft 302. For example, without limitation, passengers 602 may use dual flow 608 provided by first line 604 and second line 606 to exit aircraft 302. Passengers 602 coming from the forward portion of first aisle 518 may flow into first line 604 to exit aircraft 302, while passengers 602 coming from the aft portion of second aisle 520 may flow into second line 606 to exit aircraft 302.

Further, the flow of passengers 602 also may be such that some of passengers 602 enter aircraft 302 while other passengers 602 exit aircraft 302. For example, without limitation first line 604 of passenger 602 may be located at doorway 324 and enter aircraft 302 as shown by first flow 800 to reach first aisle 518 in first section 622 in aircraft 302.

While passengers 602 in first line 604 enter aircraft 302, other passengers in passengers 602 may move to exit aircraft 302. The movement of these other passengers in second flow 802 from first aisle 518 in second section 626 of aircraft 302 may form second line 606 as those passengers exit aircraft 302.

Figure 9:
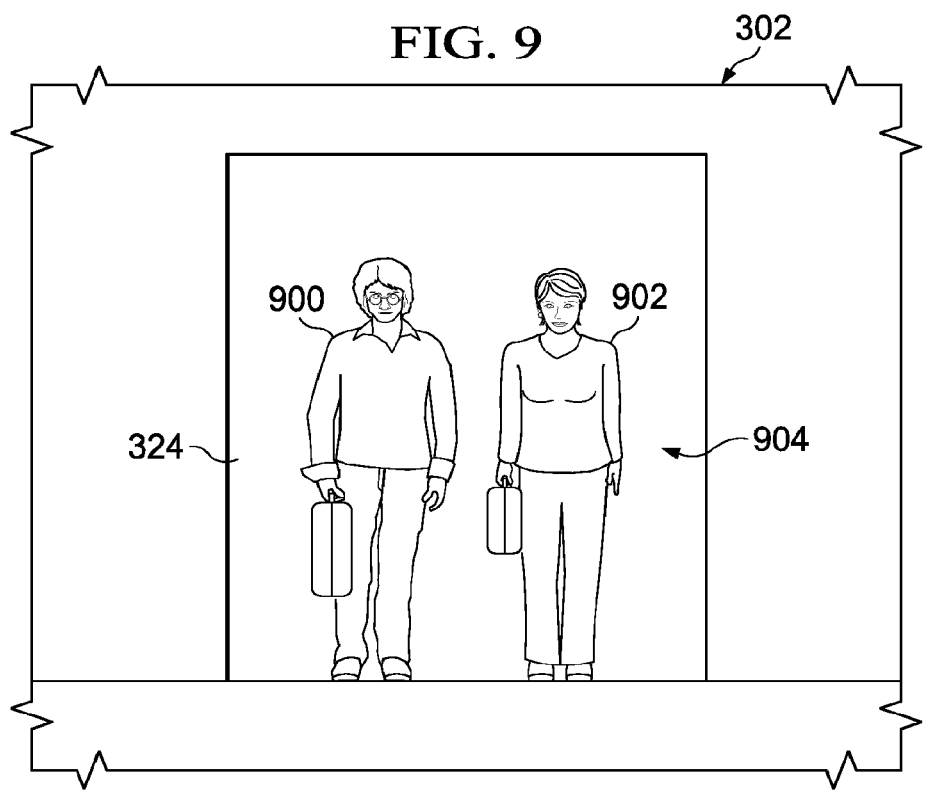
FIG. 9 is an illustration of a dual entry through a doorway in accordance with an advantageous embodiment.

Turning next to FIG. 9, an illustration of a dual entry through a doorway is depicted in accordance with an advantageous embodiment. In this illustrative example, passenger 900 and passenger 902 may pass through doorway 324 by dual entry 904. As can be seen, passenger 900 and passenger 902 may pass through doorway 324 side-by-side.

Figure 10:
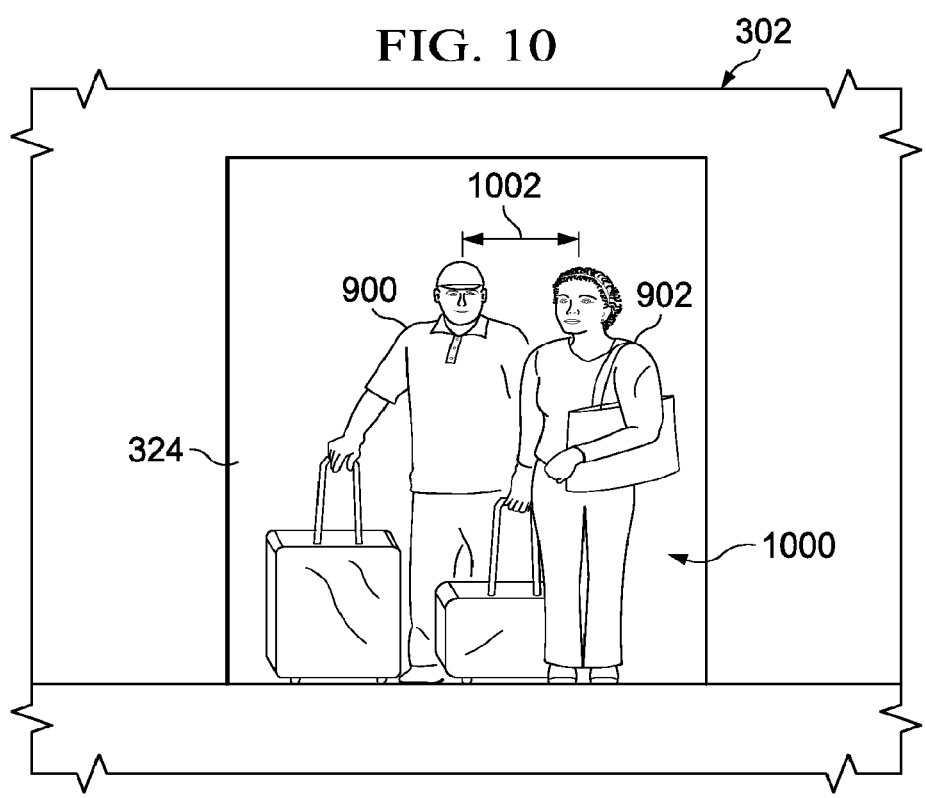
FIG. 10 is an illustration of a dual staggered entry through a doorway in accordance with an advantageous embodiment.

With reference now to FIG. 10, an illustration of a dual staggered entry through a doorway is depicted in accordance with an advantageous embodiment. In this illustrative example, passenger 900 and passenger 902 may pass through doorway 324 using dual staggered entry 1000 in contrast to dual entry 904 in FIG. 9. As can be seen in FIG. 10, passenger 900 and passenger 902 may have offset 1002 from each other when passing through doorway 324. Offset 1002 may be a distance from a single file entry in which passenger 900 is substantially behind passenger 902. Passenger 900 and passenger 902, however, may not enter using a single file entry in this example.

The different components shown in FIGS. 3 and 5-10 may be combined with components in FIG. 1, used with components in FIG. 1, or a combination of the two. Additionally, some of the components in these figures may be illustrative examples of how components shown in block form in FIG. 1 can be implemented as physical structures.

Further, the illustration of the different components in FIGS. 3 and 5-10 are only meant as examples of one or more advantageous embodiments and not meant to limit the manner in which other advantageous embodiments may be implemented.

Figure 11:
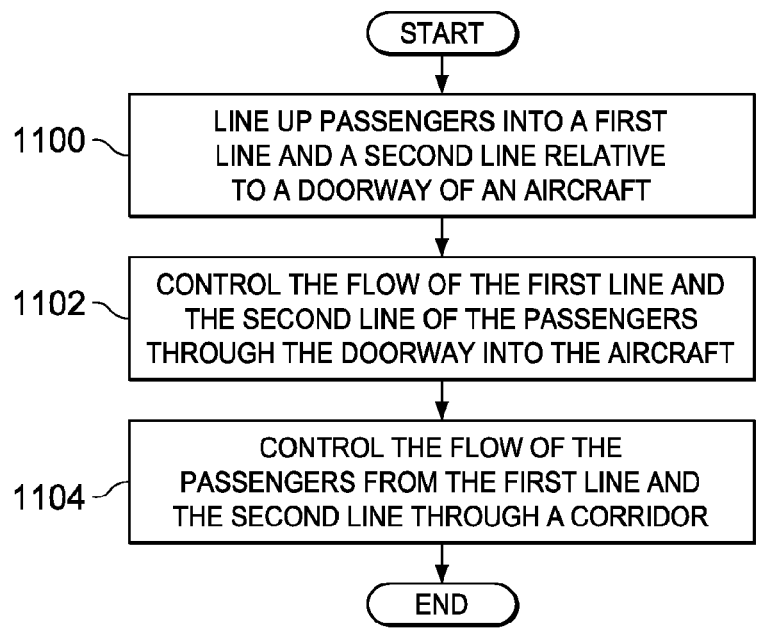
FIG. 11 is an illustration of a flowchart of a process for boarding an aircraft in accordance with an advantageous embodiment.

With reference now to FIG. 11, an illustration of a flowchart of a process for boarding an aircraft is depicted in accordance with an advantageous embodiment. The process illustrated in FIG. 11 may be implemented using passenger flow control system 128 in FIG. 1.

The process may begin by lining up passengers 102 into first line 133 and second line 134 relative to doorway 112 of aircraft 104 (operation 1100). First line 133 and second line 134 may be next to each other at doorway 112 in this illustrative example.

The process then may control flow 130 of first line 133 and second line 134 of passengers 102 through doorway 112 into aircraft 104 (operation 1102). In this illustrative example, doorway 112 may be configured to allow at least one of dual staggered entry 140 and dual entry 146 of passengers 102 in first line 133 and second line 134 through doorway 112.

The process may control flow 130 of passengers 102 from first line 133 and second line 134 through corridor 114 (operation 1104) with the process terminating thereafter. Corridor 114 may connect doorway 112 to first aisle 108 and second aisle 110 in aircraft 104. Flow 130 of passengers 102 in operation 1004 may pass through number of spaces 120 in corridor 114. Number of spaces 120 may be reserved for a number of crew members during emergency operations when passengers 102 exit aircraft 104.

Although this process is illustrated for boarding aircraft 104, the process also may be used to disembark aircraft 104. Further, although the different processes are illustrated with respect to a walkway, these processes also may be used with other boarding platforms, such as a mobile stairway or other suitable platform.

Figure 12:
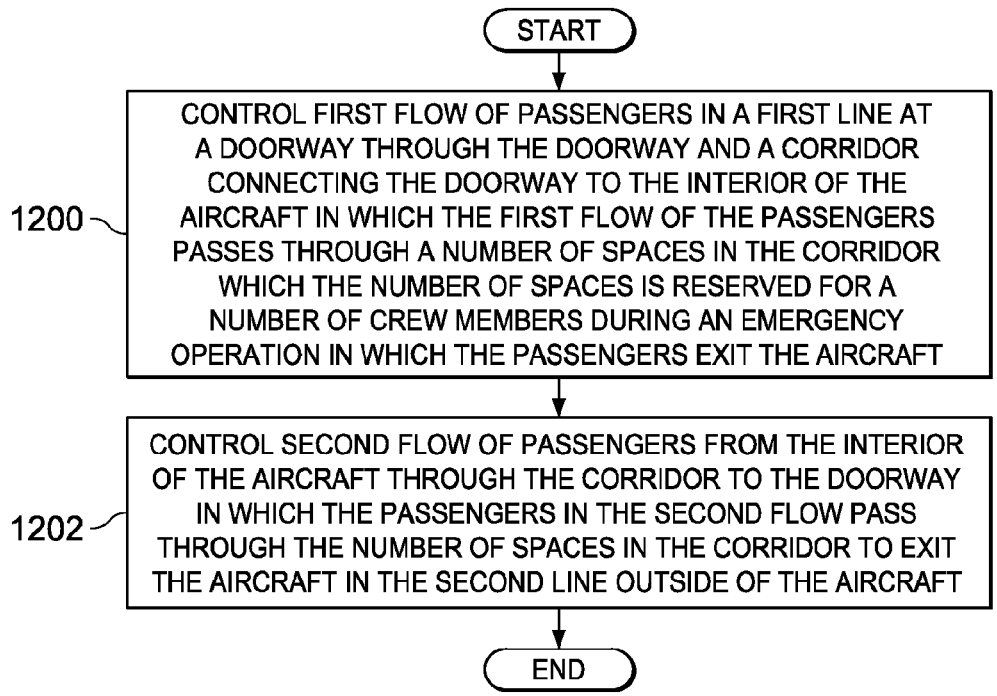
FIG. 12 is an illustration of a flowchart of a process for managing movement of passengers in accordance with an illustrative embodiment.

Turning next to FIG. 12, an illustration of a flowchart of a process for managing movement of passengers is depicted in accordance with an illustrative embodiment. The process illustrated in FIG. 12 may be implemented using passenger flow control system 128 in FIG. 1.

The process may control first flow 620 of passengers 602 in first line 604 at doorway 324 through doorway 324 and corridor 506 connecting doorway 324 to the interior of the aircraft in which first flow 620 of passengers 602 passes through a number of spaces in corridor 506 which the number of spaces is reserved for a number of crew members during an emergency operation in which passengers 602 exit the aircraft (operation 1200).

The process also may control second flow of passengers 602 from the interior of the aircraft through corridor 506 to doorway 324 in which passengers 602 in second flow 624 pass through the number of spaces in corridor 506 to exit aircraft 302 in second line 606 outside of the aircraft (operation 1202), with the process terminating thereafter. The first line may be adjacent to the second line outside of the aircraft. Also, first flow 620 may be to first section 622 in aircraft 302, while second flow 624 may be from second section 626 in aircraft 302.

The flowcharts and block diagrams in the different depicted embodiments illustrate the architecture, functionality, and operation of some possible implementations of apparatuses and methods in an advantageous embodiment. In this regard, each block in the flowcharts or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations of an advantageous embodiment, the function or functions noted in the block may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

For example, the operations in FIG. 10 also may include one or more operations in which crew members, airport operators, or other suitable personnel provide instructions for boarding or disembarking an aircraft. In one illustrative example, first line 133 and second line 134 may be formed based on locations of passengers 102 in an aircraft. For example, passengers farther back in a passenger cabin may be closer to the front of the line than passengers closer to the front of a passenger cabin. As another example, passengers of a higher class of travel, such as first class, may be closer to the front of the line than passengers of a lower class of travel, such as an economy class.

As another example, the operation 1200 and operation 1202 in FIG. 12 may occur at substantially the same time. The process in FIG. 11 may be performed at one door in an aircraft while the process in FIG. 12 may be used at another door of the aircraft.

Turning now to FIG. 13, an illustration of a data processing system is depicted in accordance with an advantageous embodiment. Data processing system 1300 is an example of a data processing system that may be used to implement one or more computers in computer system 204 shown in block form in FIG. 2. In this illustrative example, data processing system 1300 includes communications framework 1302, which provides communications between processor unit 1304, memory 1306, persistent storage 1308, communications unit 1310, input/output (I/O) unit 1312, and display 1314.

Processor unit 1304 serves to execute instructions for software that may be loaded into memory 1306. Processor unit 1304 may be a number of processors, a multi-processor core, or some other type of processor, depending on the particular implementation. A number, as used herein with reference to an item, means one or more items. Further, processor unit 1304 may be implemented using a number of heterogeneous processor systems in which a main processor is present with secondary processors on a single chip. As another illustrative example, processor unit 1304 may be a symmetric multi-processor system containing multiple processors of the same type.

Memory 1306 and persistent storage 1308 are examples of storage devices 1316. A storage device may be any piece of hardware that is capable of storing information, such as, for example, without limitation, data, program code in functional form, and other suitable information either on a temporary basis and/or a permanent basis. Storage devices 1316 also may be referred to as computer readable storage devices in these examples. Memory 1306, in these examples, may be, for example, a random access memory or any other suitable volatile or non-volatile storage device. Persistent storage 1308 may take various forms, depending on the particular implementation.

For example, persistent storage 1308 may contain one or more components or devices. For example, persistent storage 1308 may be a hard drive, a flash memory, a rewritable optical disk, a rewritable magnetic tape, or some combination of the above. The media used by persistent storage 1308 also may be removable. For example, a removable hard drive may be used for persistent storage 1308.

Communications unit 1310, in these examples, provides for communications with other data processing systems or devices. In these examples, communications unit 1310 may be a network interface card. Communications unit 1310 may provide communications through the use of either or both physical and wireless communications links.

Input/output unit 1312 allows for input and output of data with other devices that may be connected to data processing system 1300. For example, input/output unit 1312 may provide a connection for user input through a keyboard, a mouse, and/or some other suitable input device. Further, input/output unit 1312 may send output to a printer. Display 1314 provides a mechanism to display information to a user.

Instructions for the operating system, applications, and/or programs may be located in storage devices 1316, which are in communication with processor unit 1304 through communications framework 1302. In these illustrative examples, the instructions may be in a functional form on persistent storage 1308. These instructions may be loaded into memory 1306 for execution by processor unit 1304. The processes of the different embodiments may be performed by processor unit 1304 using computer implemented instructions, which may be located in a memory, such as memory 1306.

These instructions may be referred to as program code, computer usable program code, or computer readable program code that may be read and executed by a processor in processor unit 1304. The program code in the different embodiments may be embodied on different physical or computer readable storage media, such as memory 1306 or persistent storage 1308.

Program code 1318 may be located in a functional form on computer readable media 1320 that is selectively removable and may be loaded onto or transferred to data processing system 1300 for execution by processor unit 1304. Program code 1318 and computer readable media 1320 form computer program product 1322 in these examples. In one example, computer readable media 1320 may be computer readable storage media 1324 or computer readable signal media 1326. Computer readable storage media 1324 may include, for example, an optical or magnetic disk that may be inserted or placed into a drive or other device that is part of persistent storage 1308 for transfer onto a storage device, such as a hard drive, that is part of persistent storage 1308. Computer readable storage media 1324 also may take the form of a persistent storage, such as a hard drive, a thumb drive, or a flash memory, that may be connected to data processing system 1300. In some instances, computer readable storage media 1324 may not be removable from data processing system 1300. In these examples, computer readable storage media 1324 may be a physical or tangible storage device used to store program code 1318 rather than a medium that propagates or transmits program code 1318. Computer readable storage media 1324 also may be referred to as a computer readable tangible storage device or a computer readable physical storage device. In other words, computer readable storage media 1324 may be media that can be touched by a person.

Alternatively, program code 1318 may be transferred to data processing system 1300 using computer readable signal media 1326. Computer readable signal media 1326 may be, for example, a propagated data signal containing program code 1318. For example, computer readable signal media 1326 may be an electromagnetic signal, an optical signal, and/or any other suitable type of signal. These signals may be transmitted over communications links, such as wireless communications links, optical fiber cable, coaxial cable, a wire, and/or any other suitable type of communications link.

In other words, the communications link and/or the connection may be physical or wireless in the illustrative examples.

In some advantageous embodiments, program code 1318 may be downloaded over a network to persistent storage 1308 from another device or data processing system through computer readable signal media 1326 for use within data processing system 1300. For instance, a program code stored in a computer readable storage medium in a server data processing system may be downloaded over a network from the server to data processing system 1300. The data processing system providing program code 1318 may be a server computer, a client computer, or some other device capable of storing and transmitting program code 1318.

The different components illustrated for data processing system 1300 are not meant to provide architectural limitations to the manner in which different embodiments may be implemented. The different advantageous embodiments may be implemented in a data processing system including components in addition to and/or in place of those illustrated for data processing system 1300. Other components shown in FIG. 13 can be varied from the illustrative examples shown. The different embodiments may be implemented using any hardware device or system capable of running a program code.

In another illustrative example, processor unit 1304 may take the form of a hardware unit that has circuits that are manufactured or configured for a particular use. This type of hardware may perform operations without needing a program code to be loaded into a memory from a storage device to be configured to perform the operations.

For example, when processor unit 1304 takes the form of a hardware unit, processor unit 1304 may be a circuit system, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. With this type of implementation, program code 1318 may be omitted because the processes for the different embodiments are implemented in a hardware unit.

In still another illustrative example, processor unit 1304 may be implemented using a combination of processors found in computers and hardware units. Processor unit 1304 may have a number of hardware units and a number of processors that are configured to run program code 1318. With this depicted example, some of the processes may be implemented in the number of hardware units, while other processes may be implemented in the number of processors.

In another example, a bus system may be used to implement communications framework 1302 and may be comprised of one or more buses, such as a system bus or an input/output bus. Of course, the bus system may be implemented using any suitable type of architecture that provides for a transfer of data between different components or devices attached to the bus system.

Additionally, a communications unit may include a number of more devices that transmit data, receive data, or transmit and receive data. A communications unit may be, for example, a modem or a network adapter, two network adapters, or some combination thereof. Further, a memory may be, for example, memory 1306, or a cache, such as found in an interface and memory controller hub that may be present in communications framework 1302.

Advantageous embodiments of the disclosure may be described in the context of aircraft manufacturing and service method 1400 as shown in FIG. 14 and aircraft 1500 as shown in FIG. 15. Turning first to FIG. 14, an illustration of an aircraft manufacturing and service method is depicted in accordance with an advantageous embodiment. During pre-production, aircraft manufacturing and service method 1400 may include specification and design 1402 of aircraft 1500 in FIG. 15 and material procurement 1404.

During production, component and subassembly manufacturing 1406 and system integration 1408 of aircraft 1500 in FIG. 15 takes place. Thereafter, aircraft 1500 in FIG. 15 may go through certification and delivery 1410 in order to be placed in service 1412. While in service 1412 by a customer, aircraft 1500 in FIG. 15 is scheduled for routine maintenance and service 1414, which may include modification, reconfiguration, refurbishment, and other maintenance or service.

Each of the processes of aircraft manufacturing and service method 1400 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 15, an illustration of an aircraft is depicted in which an advantageous embodiment may be implemented. In this example, aircraft 1500 is produced by aircraft manufacturing and service method 1400 in FIG. 14 and may include airframe 1502 with plurality of systems 1504 and interior 1506.

Interior 1506 may include corridor 1507 and/or at least a portion of doorway 1509. Corridor 1507 may be, for example, without limitation, corridor 114 in FIG. 1. Doorway 1509 may be, for example, without limitation, doorway 112 in FIG. 1. Corridor 1507 and/or doorway 1509 may be, for example, without limitation, designed during specification and design 1402 in FIG. 14, manufactured during component and subassembly manufacturing 1406, and put in use during in service 1412. During in service 1412, doorway 1509 and corridor 1507 may be used to provide dual flow 150 and/or dual staggered flow 148 in FIG. 1.

Examples of systems 1504 include one or more of propulsion system 1508, electrical system 1510, hydraulic system 1512, and environmental system 1514. Any number of other systems may be included.

Apparatuses and methods embodied herein may be employed during at least one of the stages of aircraft manufacturing and service method 1400 in FIG. 14.

For example, doorway 324 may be configured during component and subassembly manufacturing 1406, as an upgrade, or as a reconfiguration of aircraft 1500 during maintenance and service 1414. One or more apparatus embodiments, method embodiments, or a combination thereof may be utilized while aircraft 1500 is in service 1412 and/or during maintenance and service 1414 in FIG. 14. For example, without limitation, passenger flow control system 128 may be used during in service 1412.

The use of one or more advantageous embodiments may reduce the amount of time that aircraft 1500 spends at a gate while in service 1412.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A passenger flow control system that comprises:
   a doorway in an aircraft configured such that the doorway comprises a passenger door mounted, via a hinge along one side of the passenger door, onto a single door frame, such that in operation, passengers arranged in two lines outside of the doorway of the aircraft to enter the aircraft through the doorway;
   a corridor inside the aircraft connecting the doorway to an interior of the aircraft; and
   a number of spaces in the corridor configured such that a flow of the passengers passes through the number of spaces in the corridor in which the number of spaces is reserved for a number of crew members during an emergency operation in which the passengers exit the aircraft.

2. The passenger flow control system of claim 1, wherein the corridor connects the doorway a first aisle and a second aisle in the interior of the aircraft.

3. The passenger flow control system of claim 1 further comprising:
   a first wall; and
   a second wall, wherein the first wall and the second wall define a width of the corridor.

4. The passenger flow control system of claim 1, wherein the flow of the passengers is at least one of a dual staggered flow and a dual flow of the passengers.

5. The passenger flow control system of claim 1, wherein the doorway into the aircraft is configured to allow at least one of a dual staggered entry and a dual entry of the passengers in a first line and a second line through the doorway.

6. The passenger flow control system of claim 1, wherein the corridor has a first width that is substantially equal to a second width of the doorway.

7. The passenger flow control system of claim 1, wherein the doorway has a width of at least about 60 inches.

8. The passenger flow control system of claim 1, wherein the doorway has a width configured to allow two of the passengers to pass through the doorway substantially side-by-side in which the passengers are within about a $97.5^{th}$ percentile with respect to size.

9. The passenger flow control system of claim 1, wherein the number of spaces is specified by a regulatory agency.

10. The passenger flow control system of claim 1, wherein a space in the number of spaces has a width of about 12.25 inches and a depth of about 20.50 inches and is located substantially adjacent to a wall defining the corridor.

11. A passenger flow control system for an aircraft comprising:
    a doorway in the aircraft configured to allow passengers arranged in two lines outside of the doorway of the aircraft to enter the aircraft in which the doorway into the aircraft is configured such that the doorway comprises a passenger door mounted, via a hinge along one side of the passenger door, onto a single door frame, such that in operation, at least one of: a dual staggered entry, and a dual entry of the passengers, in a first line and a second line, through the doorway and in which a first width of the doorway is configured to allow two of the passengers to pass through the doorway substantially side-by-side in which the passengers are within about a $97.5^{th}$ percentile with respect to size;
    a corridor inside the aircraft connecting the doorway to a first aisle and a second aisle in an interior of the aircraft in which a first wall and a second wall define a first width of the corridor and in which the first width of the corridor and a second width of the doorway are each about 60 inches; and
    a number of spaces in the corridor configured such that a flow of the passengers passes through the number of spaces in the corridor in which the number of spaces is reserved for a number of crew members during an emergency operation in which the passengers exit the aircraft; in which the flow of the passengers is at least one of: a dual staggered flow and a dual flow of the passengers.

12. The passenger flow control system of claim 1, wherein the number of spaces comprises a first space and a second space.

13. The passenger flow control system of claim 11, further comprising the number of spaces comprises a first space and a second space.

14. The passenger flow control system of claim 11, further comprising the number of spaces that equal a number of spaces specified by a regulatory agency.

15. A doorway configured to control a flow of passengers for an aircraft, such that the doorway comprises:
    a passenger door mounted, via a hinge along one side of the passenger door, onto a single door frame, such that in operation the doorway allows:
    a control of a first flow of the passengers in a first line at a doorway through the doorway and a corridor connecting the doorway to an interior of the aircraft in which the first flow of the passengers passes through a number of spaces in the corridor in which the number of spaces is reserved for a number of crew members during an emergency operation in which the passengers exit the aircraft; and
    a control of a second flow of the passengers from the interior of the aircraft through the corridor to the doorway in which the second flow of the passengers passes through the number of spaces in the corridor to exit the aircraft in a second line outside of the aircraft.

16. The doorway of claim 15, wherein the first line is adjacent to the second line outside of the aircraft.

17. The doorway of claim 15, wherein the aircraft has at least one aisle in the interior of the aircraft.

18. The doorway of claim 15, wherein the first flow is to a first section in the aircraft, while the second flow is from a second section in the aircraft.

19. The doorway of claim 15, wherein the doorway has a width configured to allow two of the passengers to pass through the doorway substantially side-by-side in which the passengers are within about a $97.5^{th}$ percentile with respect to size.

20. The doorway of claim 15, wherein a space in the number of spaces has a width of about 12.25 inches and a depth of about 20.50 inches and is located substantially adjacent to a wall defining the corridor.

* * * * *